United States Patent [19]
Sato

[11] Patent Number: 5,818,552
[45] Date of Patent: Oct. 6, 1998

[54] TRANSMISSIVE DISPLAY DEVICE HAVING TWO REFLECTION METALLIC LAYERS OF DIFFERING REFLECTANCES

[75] Inventor: Takusei Sato, Kanagawa, Japan

[73] Assignee: Sony Corporation, Tokyo, Japan

[21] Appl. No.: 681,912

[22] Filed: Jul. 30, 1996

[30] Foreign Application Priority Data

Jul. 31, 1995 [JP] Japan .................................. 7-215384

[51] Int. Cl.$^6$ ........................... G02F 1/136; G02F 1/1333
[52] U.S. Cl. .............................. 349/43; 349/110; 349/111
[58] Field of Search .................. 359/59, 67; 349/42, 349/43, 44, 110, 111

[56] References Cited

U.S. PATENT DOCUMENTS

| | | | |
|---|---|---|---|
| 4,239,346 | 12/1980 | Lloyd ........................................ | 349/44 |
| 4,568,149 | 2/1986 | Sugata et al. ............................. | 359/68 |
| 5,162,933 | 11/1992 | Kakuda et al. ........................... | 359/67 |
| 5,353,135 | 10/1994 | Edwards ................................... | 359/67 |
| 5,365,355 | 11/1994 | Hastings, III et al. ................... | 349/42 |
| 5,446,562 | 8/1995 | Sato ........................................ | 359/59 |
| 5,461,501 | 10/1995 | Sato et al. ................................. | 349/42 |

FOREIGN PATENT DOCUMENTS 0 569 601 A1  11/1993  European Pat. Off. .

OTHER PUBLICATIONS

Patent Abstracts of Japan, vol. 015, No. 091 (P–1175), Mar. 5, 1991 & JP–A–02 306222 (Sharp Corp.), Dec. 19, 1990.
Patent Abstracts of Japan, vol. 95, No. 002 & JP–A–07 043521 (Toppan Printing Co., Ltd.), Feb. 14, 1995.
Patent Abstracts of Japan, vol. 014, No. 385, (P–1094), Aug. 20, 1990 & JP–A–02 144525 (Toshiba Corp), Jun. 4, 1990.
Patent Abstracts of Japan, vol. 016, No. 268 (P–1372), Jun. 17, 1992 & JP–A–04 069622 (NEC Corp), Mar. 4, 1992.

*Primary Examiner*—William L. Sikes
*Assistant Examiner*—Walter Malinowski
*Attorney, Agent, or Firm*—Hill & Simpson

[57] ABSTRACT

A transmissive display device includes a driving substrate positioned on the emergent side which has both a group of pixels including component units each having a pixel electrode and a switching device, and a black matrix for shielding light from reaching the non-aperture part of each pixel from the incident side. The black matrix has an overlaid structure formed by overlaying a low-reflection metallic layer and a high-reflection metallic layer with an interlayer insulating film provided therebetween. Both layers are patterned, and partially overlap with each other as mutually complement to shield incident light. When observed in plan view from the incident side, the exposing area of the low-reflection layer is enlarged, while the exposing area of the high-reflection metallic layer is reduced to suppress the surface reflectance of the black matrix. Thereby, multiple reflection inside liquid crystal does not occur, and it is possible to prevent contrast deterioration caused by leaked rays.

12 Claims, 5 Drawing Sheets

TRANSMISSIVE DISPLAY DEVICE HAVING TWO REFLECTION METALLIC LAYERS OF DIFFERING REFLECTANCES

BACKGROUND OF THE INVENTION

1. Field of the Invention

This invention relates to a transmissive display device with an active matrix structure, having a driving substrate, a counter substrate, and liquid crystal held therebetween. In particular, this invention relates to a so-called on-chip black structure in which there is formed a black matrix for shielding light, as well as pixel electrodes and switching devices, on a driving substrate.

2. Description of the Related Art

Liquid crystal display devices are widely used in televisions, graphic displays, and so forth. Among them, in particular, an active-matrix type liquid crystal display apparatus has high speed responsibility and is suitable for having an increased number of pixels, and has been anticipated and researched in order to realize enhanced quality of a display screen, an enlarged size of the screen, a multi-colored display, and so on, and as a result, there already has been achieved a practical example. As shown in FIG. 5, this active matrix type liquid crystal display apparatus has a driving substrate on which a scanning bus line pattern and a signal bus line pattern are formed perpendicular to each other. Switching devices 102 and pixel electrodes 103 are formed respectively at points where both patterns intersect with each other. On the other hand, on a counter substrate 104, there is ordinarily formed a black matrix 106 as well as a counter electrode 105. This black matrix shields incident light from the counter substrate 104 to prevent switching devices 102 from malfunctioning due to photoelectric currents, while the matrix shields leaked rays passing between the pixel electrodes 103 arranged in a matrix to prevent deterioration of contrast. Between the driving substrate 101 and the counter substrate 104, liquid crystal is provided. However, providing the black matrix 106 on the counter substrate 104 requires fine alignment with the driving substrate 101, which thus creates difficulties in assembly. As a countermeasure against such a difference in alignment, a method is generally used wherein a black matrix is provided so as to overlap to some extent with the respective pixel electrodes 103. With this method, it is possible to reduce an alignment error caused by putting together the driving substrate 101 and the counter substrate 101, to the size of an overlapping part. However, providing an overlapping part causes a reduction of the aperture area of the black matrix 106 with respect to the pixel electrode 103 by the amount of such overlap, so that the aperture ratio deteriorates and reduces the brightness of the pixel. The black matrix 106 is formed of, e.g., a metallic layer with light-shielding properties, and to some extent reflects incident light. The reflected light is repeatedly reflected on the counter substrate 104 and so forth, a part of which travels into the liquid crystal 107.

As described above, a black matrix provided on a counter electrode causes a problem in that a difference in alignment occurs when a driving substrate and a counter substrate are joined together. To this end, there has been proposed a so-called on-chip black structure formed by providing the black matrix on the driving substrate. On the same substrate, it is possible to realize alignment precision between a pixel electrode and a black matrix, up to approximately 1 μm. Such an on-chip black structure is disclosed in, e.g., Japanese Patent Laid-Open Publication No. 5-181159, which is schematically shown in FIG. 6. Parts that correspond to those in an embodiment shown in FIG. 5 are denoted by the corresponding reference numerals, so as to be readily understood. However, since the on-chip structure has a black matrix 106 formed by, e.g., a metallic layer, and provided on a matrix array substrate 101, and has no light-shielding layer on a counter substrate 104, a problem arises such that multiple reflection occurs, so that contrast deteriorates. As described above, since the black matrix 106 is formed by a metallic layer, it reflects incident light at a certain ratio. A reflection layer provided on the matrix array 101 creates light components that are repeatedly reflected in liquid crystal 107. The multiple reflection light in the liquid crystal 107 has a different polarization plane from normal light passing through the liquid crystal only once, and as a result, even in the case of displaying black, leaked rays appear, so that contrast deteriorates. In particular, in a region in which there is a reverse tilt domain caused by a lateral electric field, multiple reflection causes a great amount of leaked rays. Multiple reflection occurs in connection with not only incident light from the counter substrate 104 but also incident light from the matrix array 101, which thus affects contrast.

SUMMARY OF THE INVENTION

An object of the present invention is to provide a transmissive display device, having an active matrix structure, suitable for preventing contrast deterioration caused by multiple reflection in the liquid crystal.

To this end, according to the present invention, there is provided a transmissive display device comprising: a first transparent substrate disposed on the incident side for receiving incident light and having a counter electrode; a second transparent substrate having pixels formed in a matrix and a black matrix for shielding, from the incident side, light from reaching the non-aperture parts of the pixels; and an electro-optical material provided between the first and second transparent substrates, the respective pixels each including a pixel electrode and a switching device, and the black matrix having an overlaid structure formed by overlaying a first reflection metallic layer with first reflectance and a second reflection metallic layer with second reflectance higher than the first reflectance, with an insulating film provided therebetween, both of which are formed such that they are patterned and partially overlap with each other as mutually complement to shield the incident light.

Preferably, the first reflection metallic layer is positioned closer to the incident side than the second reflection metallic layer, and the pattern of the first reflection metallic layer is extended over the pattern of the second reflection metallic layer.

The first reflection metallic layer may include a light-shielding pattern positioned along the row direction of the pixels arranged in a matrix, while the second reflection metallic layer may include a wiring pattern positioned along the column direction.

It is preferred that the first reflection metallic layer includes an extended light-shielding pattern having a floating potential, separated and isolated from the light-shielding pattern whose potential is fixed, and the extended light-shielding pattern is positioned above the wiring pattern.

It is preferred that the second reflection metallic layer is positioned closer to the incident side than the first reflection metallic layer, and the pattern of the second reflection metallic layer, overlaid on the pattern of the first reflection metallic layer, is selectively removed.

The electro-optical material may comprise a liquid crystal.

The switching device may comprise a thin film transistor.

The first reflection metallic layer may comprise Ti.

The second reflection metallic layer may comprise Al.

DESCRIPTION OF THE PREFERRED EMBODIMENTS

An embodiment of a transmissive display device in accordance with the present invention will be described below.

Figure 1A:
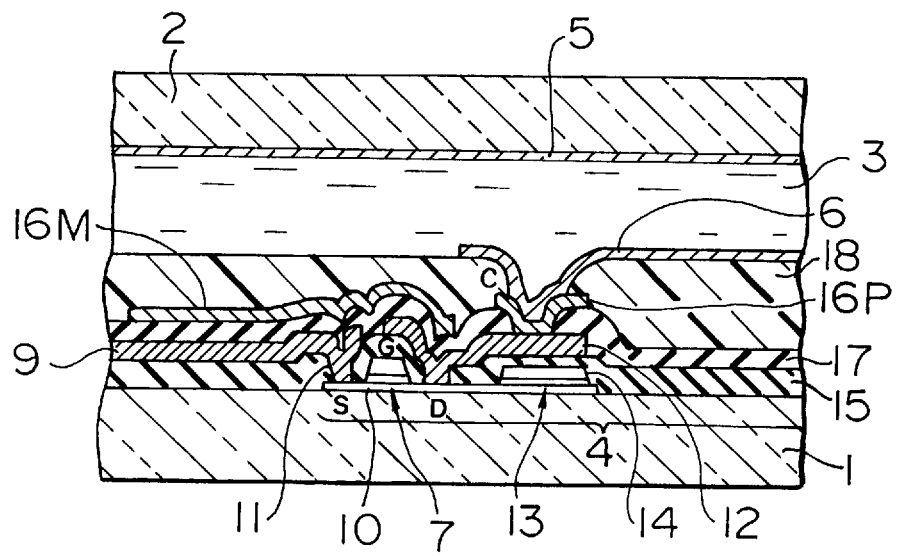
FIG. 1A is a partially sectional schematic view illustrating a transmissive display device in accordance with an embodiment of the present invention.

By referring to FIG. 1A, there is shown a schematic sectional structure of the transmissive display device. The transmissive display device has a panel structure having a pair of transparent substrates joined together over a predetermined distance with an electro-optical material provided therebetween. In this embodiment, the pair of transparent substrates includes a matrix array substrate 1 and a counter substrate 2, between which liquid crystal 3 is provided as the electro-optical material. The counter substrate 2 is positioned on the incident side, and has at least a counter electrode 5. The driving substrate 1 positioned on the emergent side has a group of pixels 4 each having, as a constituent unit, a pixel electrode 6 and a switching device 7, and has a black matrix which shields light, from the incident side, from reaching the non-aperture parts of the respective pixels. To simplify illustration, only one pixel 4 is shown.

The black matrix includes an overlaid structure in which a low-reflection metallic layer with relatively low reflectance (16M, 16P) is laid over a high-reflectance metallic layer with relatively high reflectance (9, 11, 12) with an interlayer insulating film 17 spaced therebetween. Both layers are patterned, and partially overlap with each other as mutually complement to shield incident light. When observed in plan view from the incident side, the exposing area of the low-reflection metallic layer (16M, 16P) is enlarged, while the exposing area of the high-reflection layer (9, 11, 12) is reduced, so that the surface reflection on the black matrix is reduced. The black matrix is formed such that the low-reflection metallic layer (16M, 16P) is positioned closer to the incident side than the high-reflection layer (9, 11, 12), thus, the pattern of the former is extended over the pattern of the latter, thereby reducing the surface reflection on the black matrix. The low-reflection metallic layer (16M, 16P) is made from, e.g., Ti, the thickness of which is set to 250 nm. In this case, the low-reflection metallic layer has an optical density of approximately 4, and thus has an extremely great light-shielding properties, and a reflectance of approximately 25%. On the other hand, the high-reflection layer (9, 11, 12) is made from, e.g., Al, the thickness of which is approximately 600 nm. The high-reflection layer has an optical density of about slightly less than 5, and thus has extremely great light-shielding properties. Further, its reflectance is approximately 95%. Within the transmissive range of the effects of capacitive coupling between the high-reflection metallic layer made from Al and the low-reflection metallic layer made from Ti, the high-reflection metallic layer (Ti) may be provided above the low-reflection metallic layer (Al).

This arrangement of both layers enables the surface reflectance of the driving substrate 1 to be reduced to realize, e.g., a contrast of not less than 150. An arrangement which does not use such a countermeasure results in a contrast of not more than 100. As materials for the metallic layers forming the black matrix it is possible to use ordinary wiring materials such as Ti, Cr, Mo, Ta, W, Al, Cu, TiN, and CrO.

Figure 1B:
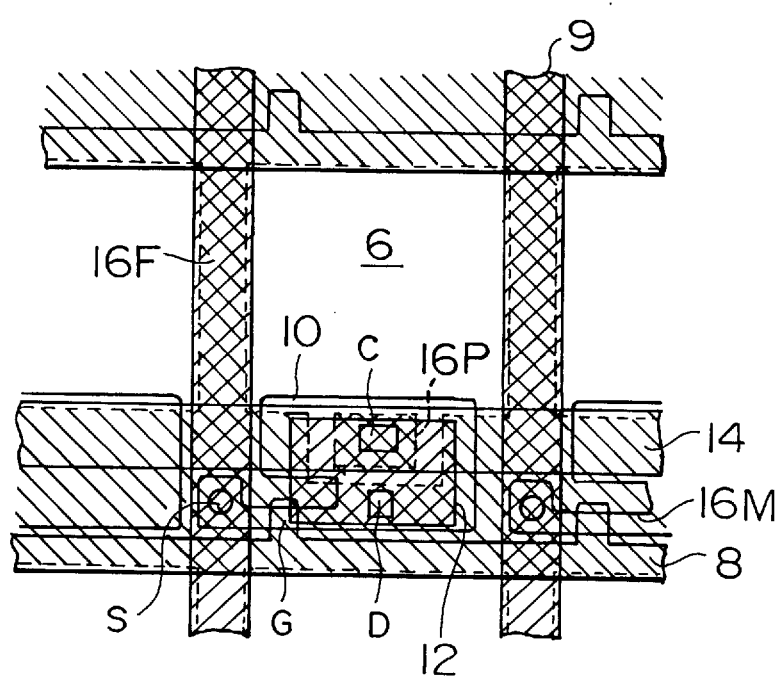
FIG. 1B is a schematic partial plan view illustrating the transmissive display device in accordance with the embodiment of the present invention.

As shown in FIG. 1B, the low-reflection metallic layer includes a light-shielding masking pattern 16M provided along the row direction of the pixel electrodes arranged in a matrix, while the high-reflection metallic layer includes a signal bus line pattern 9 provided along the column direction of the pixel electrodes. The light-shielding masking pattern 16M and the signal bus line pattern 9 complement each other to form a grid-shaped black matrix. The low-reflection metallic layer includes not only the light-shielding masking pattern 16M provided along the row direction but also an extended light-shielding pattern 16F which is continuous therefrom. This extended light-shielding pattern 16F is provided above the signal bus line pattern 9 provided along the column direction. Therefore, the surface reflectance of the black matrix can be reduced.

By referring further to FIG. 1A, the detailed structure of the driving substrate 1 will be described below.

The driving substrate 1 is formed so as to be separated into an upper layer, an intermediate layer, and a lower layer. The upper layer includes the pixel electrodes 6 formed for the respective pixel 4. The lower layer includes the switching devices 7 for enabling the pixel electrodes 6 to be operational, a scanning bus line pattern (not shown) for scanning the rows of thin film transistors corresponding to the respective rows of the pixels 4, and the signal bus line pattern 9 for supplying predetermined image signals to the columns of the switching devices 7 corresponding to the respective columns of the pixels 4. The switching device 7 is made from a thin film transistor having, as an active layer, a semiconductor film 10 made from polycrystal silicon, with a gate insulating film G formed in a pattern on a gate insulating film thereon. The gate insulating electrode G is continuous to the scanning bus line pattern. The thin film transistor has a source region S and a drain region D on both sides of a gate electrode G. The source region S is connected to a lead electrode 11 so as to be continuous to the signal bus line pattern 9. The drain region D is connected to the other lead electrode 12. The lead electrodes 11 and 12, and the signal bus line pattern 9 form the lower low-reflectance metallic layer. The semiconductor film 10 has an auxiliary capacitor 13 formed thereon as well as the thin film transistor. This auxiliary capacitor 13 utilizes the semiconductor film 10 for an electrode, and an auxiliary wiring pattern 14 for the other electrode. Between both electrodes, the gate insulating film, and a dielectric film that is included in the same layer as the former, are provided. The gate electrode G, the scanning wiring, and the auxiliary wiring 14 are included in the same layer, and are electrically insulated by a first interlayer insulating film 15 from the lead electrodes 11 and 12.

In the intermediate layer between the upper and lower layers, the high-reflectance metallic layer is provided. The high-reflectance metallic layer is separated into the light-shielding masking pattern 16M and the light-shielding pad pattern 16P. The light-shielding masking pattern 16M is continuously patterned along the row direction of the pixels, which at least partially shields light from reaching the switching device 7. The light-shielding masking pattern 16M is sandwiched between a second interlayer insulating film 17 and a flattening film 18, and is insulated from the lower and upper layers. The light-shielding masking pattern 16M has its potential set to fixed potential. This fixed potential is equal to, e.g., the potential of the counter electrode 5. On the other hand, the light-shielding pad pattern 16P is discretely patterned corresponding to the respective pixels 4. The light-shielding pad pattern 16P is provided in a contact C positioned between both the pixel electrode 6 and the switching device 7 corresponding thereto, and functions as an electrical contact and as a light shield. In other words, the light-shielding pad pattern 16P is sandwiched between the pixel electrode 6 and the lead electrode 12, and enables better electrical contact between the electrodes. The lead electrode 12 is included in the same layer as the signal bus line pattern 9, as described above, and is directly and electrically connected to the drain region D of the thin film transistor. The lead electrode 12 shields light passing between the light-shielding pad pattern 16P and the light-shielding masking pattern 16M, both of which are included in the high-reflection metallic layer forming the black matrix, which have light-shielding properties, and are separated from each other.

By referring to FIG. 1B, the detailed structure will be further described.

The light-shielding masking pattern 16M is formed in parallel to the scanning bus line pattern 8. Accordingly, the light-shielding masking pattern 16M is positioned perpendicular to the signal bus line pattern 9 having light-shielding properties, so that the grid-shaped black matrix is formed. The black matrix shields light from reaching the periphery of each pixel electrode 6 to define the aperture of each pixel. The thin film transistor has the lead electrode 12 which is included in the same layer as the signal bus line pattern 9, and is in direct contact with the drain region D. The lead electrode 12 is electrically connected with the pixel electrode 6 which is upwardly positioned, through the light-shielding pad pattern 16P. In other words, the light-shielding pad pattern 16P is provided in the contact C between the pixel electrode 6 and the thin film transistor. The lead electrode 12 also has light-shielding properties, and thus shields light passing between the light-shielding masking pattern 16M and the light-shielding pad pattern 16P. The auxiliary wiring pattern 14 shown in FIG. 1A is formed in parallel to the scanning-wiring pattern 8. The auxiliary wiring pattern 14 is partially laid above the semiconductor film 10, so that the above-described auxiliary capacitor is formed.

As described above, the light-shielding patterns 16M and 16P are formed above the switching device 7, the signal-wiring pattern 9, the scanning bus line pattern 8, and so forth, and are formed below the pixel electrode 6. The light-shielding masking pattern 16M is insulated from any of the signal bus line pattern 9, the scanning bus line pattern 8, and the pixel electrode 6, so that light reaching a region that must be masked is totally shielded by the smallest area. Therefore, it is possible to completely shield light from reaching a display region, only on the driving substrate 1, and thus to maximize transmittance of light of an active matrix-type display apparatus. Further, on the counter substrate 2, only the counter electrode 5 needs to be formed, so that costs of materials and assembly can be reduced. The potential of the light-shielding masking pattern 16M is set to a fixed potential, and thus functions as a shield with respect to each pixel electrode 6. On the other hand, the light-shielding pad pattern 16P is sandwiched between the pixel electrode 6 and the lead electrode 12, and enables better electrical contact between both electrodes. Further, one of features of the present invention is that the extended light-shielding pattern 16F is provided along the column direction, extended from the light-shielding pattern 16M in order to cover the signal-wiring pattern 9 which is downward positioned. As described above, the extended light-shielding pattern 16F is made from the low-reflection metallic layer, while the signal bus line pattern 9 is made from the high-reflectance metallic layer. Covering the signal bus line pattern 9 with the extended light-shielding pattern 16F enables the reduction of the surface reflection of the whole black matrix, thereby reducing contrast deterioration caused by multiple reflection inside the liquid crystal 3.

By referring further to FIGS. 1A and 1B, a method of producing the transmissive display device in accordance with the present invention will be described.

The driving substrate 1 is made from glass, quartz, or the like, on which the semiconductor film 10 is formed by using reduced-pressure chemical vapor deposition techniques. The semiconductor film 10 is made from deposited polycrystal silicon having a thickness of approximately 50 nm, and is used as an active layer of thin film transistor. After the semiconductor film 10 is formed, it is patterned in the form of an island. On the semiconductor film 10, a gate insulating film made from, e.g., $SiO_2$ is formed. In this case, as a material for the semiconductor film 10, amorphous silicon or the like may be used, in addition to polycrystal silicon. Also, as a material for the gate insulating film, SiN, tantalum oxide, or a laminate layer of these materials may be used, in addition to $SiO_2$.

Subsequently, on the driving substrate 1, the scanning-wiring pattern 8, the gate electrode G, the auxiliary wiring pattern 14, and so forth are simultaneously formed. For example, after polycrystal silicon is deposited to a thickness of 350 nm by using reduced-pressure chemical vapor deposition techniques, the deposited layer is doped with impurities in order to reduce its resistance, and the resulting layer is patterned in a predetermined form. As materials for the scanning bus line pattern 8, the gate electrode G, and the auxiliary wiring pattern 14, it is possible to use metals such as Ta, Mo, Al, Cr, and their silicides and polycides. Such a manner forms the thin film transistor comprising the semiconductor film 10, the gate insulating film, and the gate electrode G. In this embodiment, the thin film transistor is a planar type, however a normal stagger type or an inverse stagger type may be used. On the semiconductor film 10, the auxiliary capacitor 13 is simultaneously formed.

Subsequently, by using atmospheric chemical vapor deposition techniques, PSG (phospho-silicate glass), and so forth are deposited at a thickness of approximately 600 nm in order to form the first interlayer insulating film 15. The first interlayer insulating film 15 covers the scanning-wiring pattern 8, the gate electrode G, the auxiliary wiring pattern 14, and so forth. In the first interlayer insulating film 15, there is provided a contact hole reaching the source region S and the drain region D of the thin film transistor. On the first interlayer insulating film 15, there are provided, in the form of patterns, the signal bus line pattern 9, and the lead electrodes 11 and 12, as the high-reflection metallic layer positioned downward which forms the black matrix. For example, the high-reflection metallic layer is formed by depositing aluminum at a thickness of approximately 600 nm with sputtering techniques. This high-reflection metallic layer is patterned in a predetermined form in order to form the signal bus line pattern 9 and the lead electrodes 11 and 12. On the one hand, the lead electrode 11 is connected to the source region S of the thin film transistor through the contact hole, on the other hand, the lead electrode 12 is connected to the drain region D of the thin film transistor.

On the signal bus line pattern 9 and the lead electrodes 11 and 12, the second interlayer insulating film 17 is formed to coat them. For example, the second interlayer insulating film 17 is formed by depositing PSG to a thickness of approximately 600 nm with atmospheric chemical vapor deposition techniques. In this second interlayer insulating film 17, there is provided a contact hole C reaching the lead electrode 12. On the second interlayer insulating film 17, there are provided the light-shielding masking pattern 16M, the light-shielding pad pattern 16P, and the extended light-shielding pattern 16F, as the low-reflection metallic layer positioned upward which forms the black matrix. For example, the low-reflection metallic layer is formed by depositing Ti to a thickness of approximately 250 nm with sputtering techniques. This low-reflection metallic layer is patterned to form the light-shielding masking pattern 16M, the light-shielding pad pattern 16P, and the extended light-shielding pattern 16F. The light-shielding masking pattern 16M is in contact with a region outside the display pixel at the fixed potential. On the other hand, the light-shielding pad pattern 16P is in contact with the lead electrode 12 through the contact hole C. Further, the extended light-shielding pattern 16F is provided as extended from the light-shielding masking pattern 16M, thus covers the signal bus line pattern 9 positioned downward. In this embodiment, the light-shielding masking pattern 16M and the extended light-shielding pattern 16F are connected with each other over all the display pixel regions.

The flattening film 18 is formed so as to cover the light-shielding masking pattern 16M, the light-shielding pad pattern 16P, and the extended light-shielding pattern 16F. In this flattening film 18, there is provided a contact hole reaching the light-shielding pad pattern 16P. On the flattening film 18, the pixel electrode 6 is formed. For example, a transparent conductive layer made from, e.g., indium tin oxide is formed at a thickness of approximately 150 nm by using sputtering techniques, and is patterned in a predetermined form to form the pixel electrode 6. Subsequently, the counter substrate 2 on which the counter electrode 5 is wholly formed, which is made from, e.g., glass, is joined to the driving substrate 1. Between both electrodes 1 and 2, the liquid crystal 3 is put into. This liquid crystal 3 has, e.g., twisted nematic orientation.

Figure 2A:
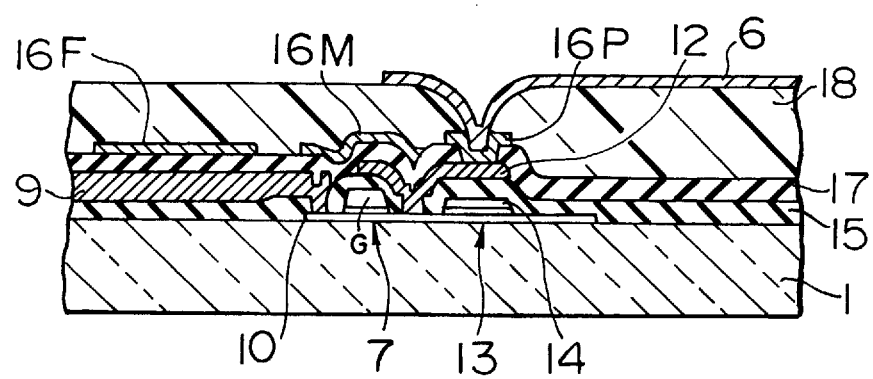
FIG. 2A is a partially sectional view illustrating a modification of the embodiment shown in FIGS. 1A and 1B.
Figure 2B:
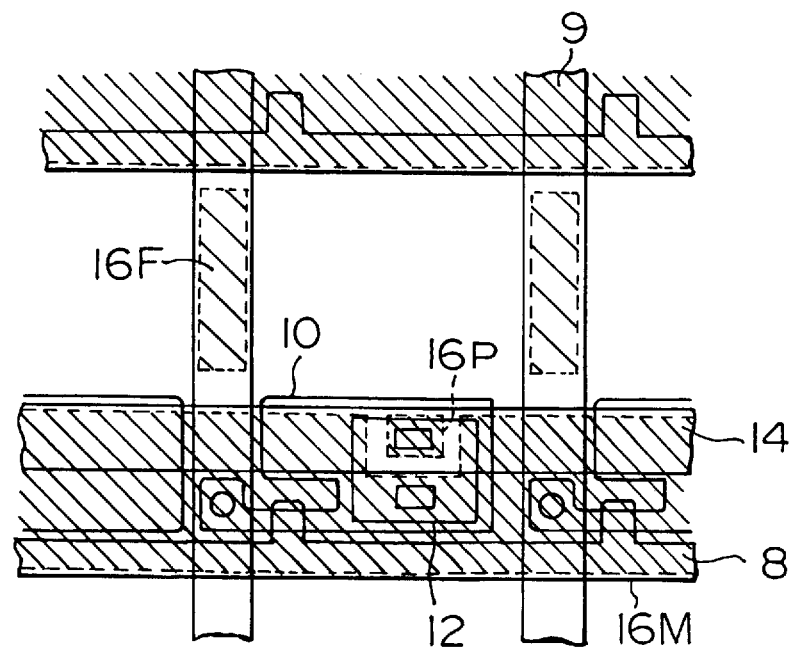
FIG. 2B is a partial plan view illustrating the modification of the embodiment shown in FIGS. 1A and 1B.

By referring to FIGS. 2A and 2B, there is shown a modification of the embodiment shown in FIGS. 1A and 1B. This modification basically has the same structure, and the corresponding parts are denoted by the corresponding reference numerals so as to be readily understood. The difference is that an extended light-shielding pattern 16F is separated from a light-shielding masking pattern 16M whose potential is fixed, and has floating potential. As described above, this extended light-shielding pattern 16F is positioned above a signal bus line pattern 9. In this embodiment, in order to suppress an increase in the load capacitance of the signal bus line pattern 9, the extended light-shielding pattern 16F positioned above the signal-wiring pattern 9 is separated to be in a floating condition.

Figure 3A:
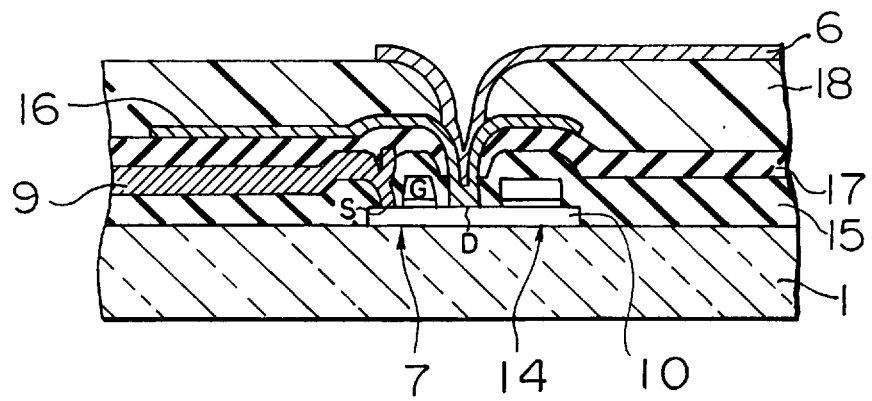
FIG. 3A is a partially sectional view illustrating another modification of the embodiment shown in FIGS. 1A and 1B.
Figure 3B:
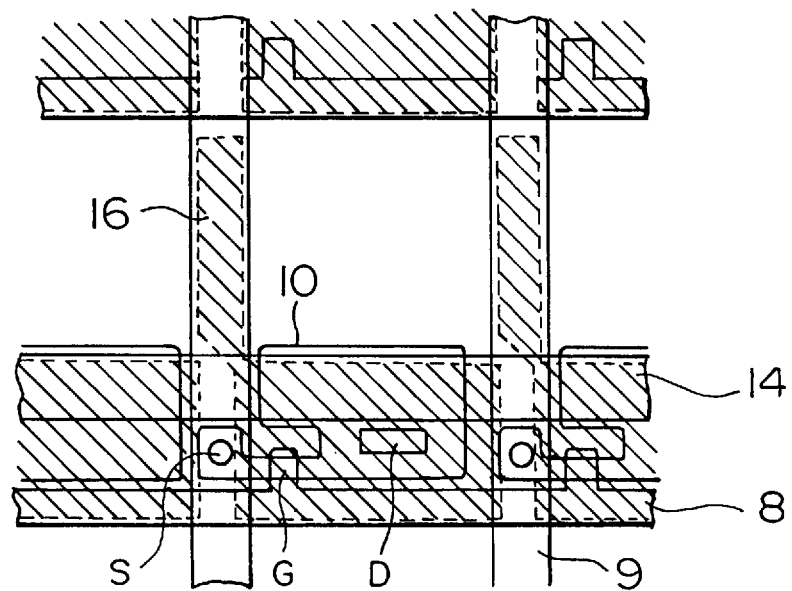
FIG. 3B is a partial plan view illustrating another modification of the embodiment shown in FIG. 3A.

By referring to FIGS. 3A and 3B, there is shown another modification of the embodiment shown in FIGS. 1A and 1B. This modification basically has the same structures, and the corresponding parts are denoted by the corresponding reference numerals so as to be readily understood. The difference is that a high-reflection metallic layer positioned upward has only a single light-shielding pattern 16. A pixel electrode 6 is electrically connected to a drain region D of a thin film transistor forming a switching device 7 through this light-shielding pattern 16. Accordingly, the light-shielding pattern 16 has the same potential as the pixel electrode 6. Since there is such a relation, the light-shielding pattern 16 is separated corresponding to the respective pixels. In other words, it may be the that the light-shielding pad pattern 16P shown in FIG. 1 is extended to become this light-shielding pattern 16. The light-shielding pattern 16 has an extender that is provided on a signal bus line pattern 9. According to the circumstances, this extender may be separated to be in a floating condition, similar to the example shown in FIG. 2.

Figure 4:
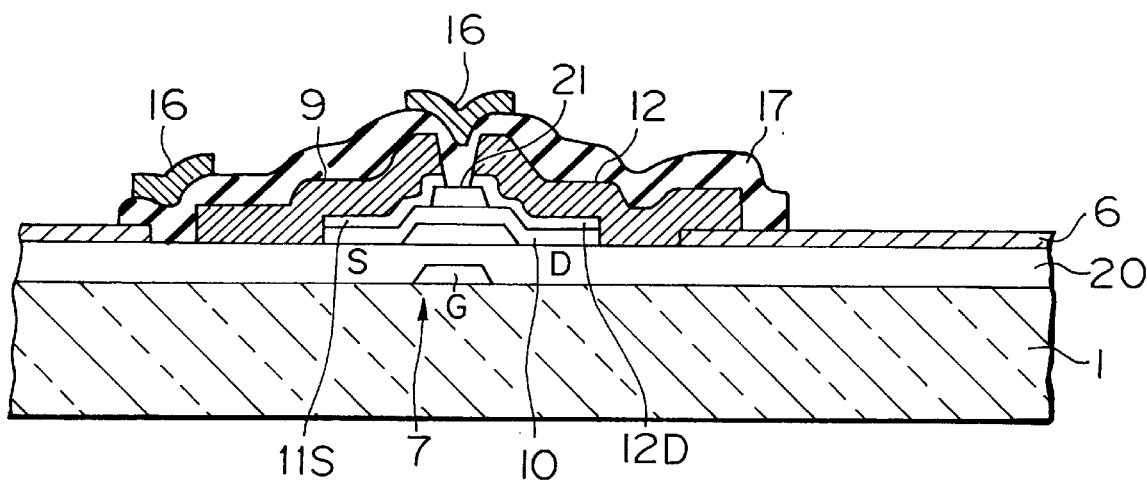
FIG. 4 is a partially sectional view illustrating a further modification of the embodiment shown in FIGS. 1A and 1B.
Figure 5:
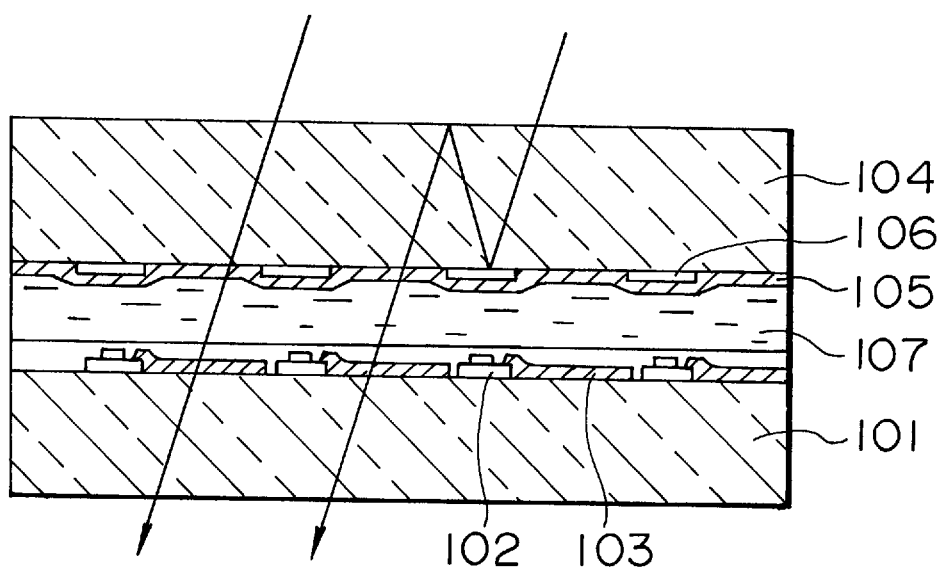
FIG. 5 is a partially sectional view illustrating an embodiment of a transmissive display device.
Figure 6:
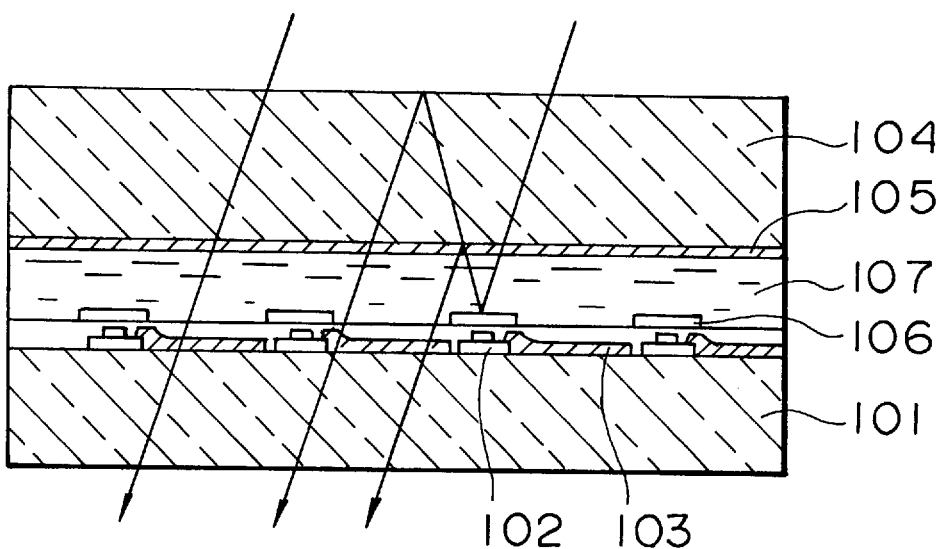
FIG. 6 is a partially sectional view illustrating an embodiment of a transmissive display device.

By referring to FIG. 4, there is shown further another modification of the embodiment shown in FIG. 1. The difference is that a bottom-gate type thin film transistor is used for the top-gate type thin film transistor, as a switching device 7. In other words, on a driving substrate 1, a gate electrode G is formed in a pattern, which is covered with a gate insulating film 20. On this gate insulating film 20, there is provided a semiconductor film 10 which is patterned in the form of an island. The bottom-gate type thin film transistor with such a configuration has a source region S connected to a signal bus line pattern 9 through a doped silicon 11S. Also, its drain region D is connected to a lead electrode 12 likewisely through a doped silicon 12D. The other end of this lead electrode 12 is connected to a pixel electrode 6. The signal bus line pattern 9 and the lead electrode 12 are electrically separated to each other by an etching stopper 21. The signal bus line pattern 9 and the lead electrode 12 are covered with an interlayer insulating film 17, on which a light-shielding pattern 16 is formed in a pattern. The light-shielding pattern 16 that is upwardly and downwardly separated by the interlayer insulating film 17, the signal bus line pattern 9, and the lead electrode 12 form a black matrix. This light-shielding pattern 16 has floating potential. Incidentally, materials for two metallic layers forming a black matrix are determined based on characteristics required in circuit design and process design, thus, the matrix does not always have lower reflectance in the upper layer. According to the circumstances, a high-reflectance metallic layer may be positioned closer to the incident side than a low-reflectance metallic layer. In this case, by selectively removing the pattern of the former overlaid on the pattern of the latter, it is preferred to provide the upper high-reflectance metallic layer so as not to cover the surface of the low-reflectance metallic layer. Thereby, it is possible to reduce the surface reflection on the black matrix. The modification in FIG. 4 shows such a structure as an example.

As described in the foregoing, in accordance with the present invention, when observed in plan view from the incident side, the exposing area of the low-reflectance metallic layer is extended, while the exposing area of the high-reflectance metallic layer is reduced, so that the surface reflectance of the whole black matrix is reduced. Thereby, contrast deterioration caused by multiple reflection in liquid crystal is effectively prevented.

While the present invention has been described in conjunction with a preferred embodiments thereof, it is evident that many alternatives, modifications and variations will be apparent to those skilled in the art. Accordingly, it is intended to embrace all such alternatives, modifications, and variations that fall within the spirit and broad scope of the appended claims.

What is claimed is:

1. A display device comprising:

a first substrate;

a second substrate spaced apart from the first substrate having a plurality of transistors formed thereon;

a first reflection metallic layer having a first reflectance formed above and at least partially covering one of said plurality of transistors;

an insulating film formed on the first reflection metallic layer;

a second reflection metallic layer formed on the insulating film over and at least partially covering said one of said plurality of transistors and also being over and at least partially covering a portion of the first reflection metallic layer, said second reflection metallic layer having a second reflectance higher than said first reflectance, wherein said first reflection metallic layer is closer to an incident side than said second reflection metallic layer, and a pattern of said first reflection metallic layer extends over a pattern of said second reflection metallic layer, and wherein said first reflection metallic layer comprises a light-shielding pattern positioned along a row direction and said second reflection metallic layer comprises a wiring pattern positioned along a column direction.

2. A display device according to claim 1, wherein said first reflection metallic layer comprises an extended light-shielding pattern having a floating potential, separated and isolated from a light-shielding pattern whose potential is fixed, and said extended light-shielding pattern is positioned above said wiring pattern.

3. A display device according to claim 2, further comprising electro-optical material comprised of a liquid crystal between said substrates.

4. A display device according to claim 2, wherein said plurality of transistors are thin film transistors.

5. A display device according to claim 2, wherein said first reflection metallic layer is comprised of Ti.

6. A display device according to claim 5, wherein said second reflection metallic layer is comprised of Al.

7. A display device comprising:

a first substrate;

a second substrate spaced apart from the first substrate having a plurality of transistors formed thereon;

a first reflection metallic layer having a first reflectance formed above and at least partially covering one of said plurality of transistors;

an insulating film formed on the first reflection metallic layer;

a second reflection metallic layer formed on the insulating film over and at least partially covering said one of said plurality of transistors and also being over and at least partially covering a portion of the first reflection metallic layer, said second reflection metallic layer having a second reflectance higher than said first reflectance, further comprising a planiarization layer formed above the second reflection metallic layer and a pixel electrode on the planiarization layer.

8. A display device according to claim 7, wherein said second reflection metallic layer is positioned closer to an incident side than said first reflection metallic layer.

9. A display device according to claim 7, further comprising electro-optical material comprised of a liquid crystal between said substrates.

10. A display device according to claim 7, wherein said plurality of transistors are thin film transistors.

11. A display device according to claim 7, wherein said first reflection metallic layer is comprised of Ti.

12. A display device according to claim 11, wherein said second reflection metallic layer is comprised of Al.

* * * * *